(12) United States Patent
Jud et al.

(10) Patent No.: US 10,786,694 B2
(45) Date of Patent: Sep. 29, 2020

(54) AIR-SUPPLY DEVICE

(71) Applicant: Avea Capital Ltd., Road Town-Tortola (VG)

(72) Inventors: Peter Jud, Metzingen (DE); Alexander Lorenz, Esslingen (DE); Mark Ital, Stuttgart (DE)

(73) Assignee: Avea Capital Ltd. (VG)

( * ) Notice: Subject to any disclaimer, the term of this patent is extended or adjusted under 35 U.S.C. 154(b) by 524 days.

(21) Appl. No.: 15/528,103

(22) PCT Filed: Oct. 27, 2015

(86) PCT No.: PCT/EP2015/002428
§ 371 (c)(1),
(2) Date: May 19, 2017

(87) PCT Pub. No.: WO2016/078773
PCT Pub. Date: May 26, 2016

(65) Prior Publication Data
US 2017/0319879 A1    Nov. 9, 2017

(30) Foreign Application Priority Data

Nov. 21, 2014 (DE) .................. 10 2014 017 533
Jul. 31, 2015 (CN) ..................... 2015 1 0461524

(51) Int. Cl.
*A62B 18/00* (2006.01)
*A47C 21/04* (2006.01)
(Continued)

(52) U.S. Cl.
CPC .......... *A62B 18/003* (2013.01); *A47C 21/044* (2013.01); *A47C 27/087* (2013.01);
(Continued)

(58) Field of Classification Search
CPC ...... A61M 16/105–106; A61M 16/107; A62B 7/10; A62B 18/003; A62B 23/00–025
See application file for complete search history.

(56) References Cited

U.S. PATENT DOCUMENTS 2,577,607 A    12/1951  Conley
3,683,907 A *   8/1972  Cotabish .................. A62B 7/12
                                                      128/200.28
(Continued)

FOREIGN PATENT DOCUMENTS

CN    1791772        6/2006
CN    102781520      11/2012
(Continued)

OTHER PUBLICATIONS

KPC website listing of industrial feeding tube (http://www.kentak.com/industrial-feeder-tubing.html) archived on Jul. 22, 2012 (Year: 2012).*

(Continued)

*Primary Examiner* — Timothy A Stanis
*Assistant Examiner* — Charles M Vivian
(74) *Attorney, Agent, or Firm* — Warner Norcross + Judd LLP

(57) ABSTRACT

An air-supply device for supplying breathing air into a breathing-air region. An inflow opening connected to an outflow region via an interior. An outflow region connected to the outflow region via the interior. The outflow region formed on a flexible, air-permeable material. For flexible use of the air-supply device and to avoid significant adverse effect to a user, provision is made for the air-supply device to have a sheet-like, flexible portion, which has a first flat side and a second flat side, located opposite the first. The outflow region arranged on the first flat side. The interior formed between the first flat side and the second flat side. In the interior, at least the outflow region has arranged on it at least one spacer, which prevents the outflow region from butting against the second flat side.

15 Claims, 4 Drawing Sheets

(51) Int. Cl.
    *A47C 27/08*       (2006.01)
    *A47C 31/00*       (2006.01)
    *A62B 7/10*         (2006.01)
    *B62B 9/14*         (2006.01)
    *B62B 9/00*         (2006.01)
    *B62B 9/10*         (2006.01)

(52) U.S. Cl.
    CPC .............. *A47C 31/006* (2013.01); *A62B 7/10* (2013.01); *A62B 18/006* (2013.01); *B62B 9/00* (2013.01); *B62B 9/14* (2013.01); *B62B 9/108* (2013.01); *B62B 9/142* (2013.01); *B62B 2204/00* (2013.01)

(56) References Cited

U.S. PATENT DOCUMENTS

| | | | | |
|---|---|---|---|---|
| 4,886,058 | A * | 12/1989 | Brostrom | A62B 18/08 |
| | | | | 128/206.12 |
| 5,048,516 | A * | 9/1991 | Soderberg | A62B 18/003 |
| | | | | 128/200.27 |
| 5,878,742 | A * | 3/1999 | Figueredo | A42B 3/288 |
| | | | | 128/201.24 |
| 7,469,432 | B2 * | 12/2008 | Chambers | A47C 21/044 |
| | | | | 5/423 |
| 9,248,248 | B2 | 2/2016 | Virr et al. | |

FOREIGN PATENT DOCUMENTS

| | | |
|---|---|---|
| CN | 203852758 | 10/2014 |
| EP | 0 280 213 | 8/1988 |
| EP | 1 645 258 | 4/2006 |
| WO | 96/39905 | 12/1996 |
| WO | 2004/056240 | 7/2004 |
| WO | 2004/092658 | 10/2004 |
| WO | 2009/133447 | 11/2009 |

OTHER PUBLICATIONS

Google Dictionary definition of "sheet"; page captured Jan. 19, 2020 (Year: 2020).*

* cited by examiner

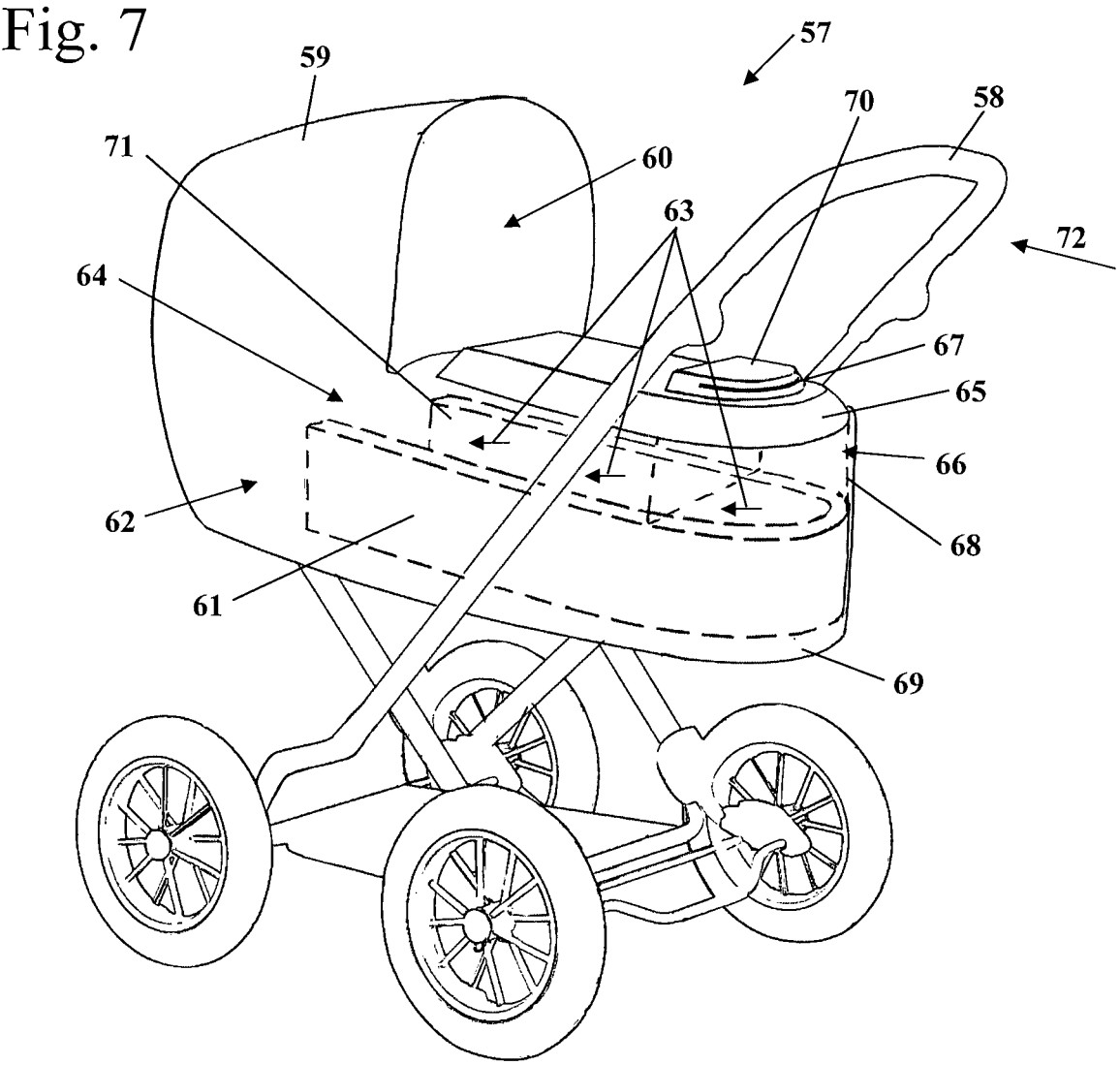

AIR-SUPPLY DEVICE

BACKGROUND OF THE INVENTION

The invention concerns an air-supply device for supply of breathing air into a breathing air region, wherein the air-supply device comprises at least one inflow opening for supply of breathing air, an interior, and at least one outflow region, through which the breathing air can flow out into the breathing air region, wherein the inflow opening is connected via the interior with the outflow region, and wherein the outflow region is formed of a flexible, air-permeable material.

WO 2004/092658 A1 discloses an air-supply device comprising a plastic housing provided with an opening for the air to exit. The opening is covered by an air-permeable textile material that is supported on a grid.

WO 96/39905 A1 discloses a mattress for a baby that is provided with a plurality of air openings at the bottom part and at side parts. The air openings are covered by a woven fabric.

It is the object of the invention to provide an air-supply device of the aforementioned kind that has a simple construction and does not bother the user.

SUMMARY OF THE INVENTION

This object is solved by an air-supply device that comprises a sheet-like, flexible section that comprises a first flat side and an oppositely positioned second flat side, wherein on the first flat side the outflow region is arranged, wherein the interior is formed between the first flat side and the second flat side, and wherein in the interior at least at the outflow region at least one spacer means is arranged that prevents contact of the outflow region at the second flat side in the unloaded state of the air-supply device.

It is provided that the air-supply device comprises a sheet-like flexible section. In this way, a minimal impairment of an operator coming into contact with the flexible section is achieved. Due to the sheet-like flexible section, the air-supply device is suitable for multiple uses and is easily adaptable to an available installation space. The air-supply device comprises two flat sides between which the interior is formed. In order to achieve a uniform outflow of breathing air across the entire outflow region, at least one spacer means is provided in the interior at least at the outflow region and prevents contact of the outflow region at the second flat side. Due to the uniform outflow of the breathing air across the entire outflow region, the draft which is caused by the supplied breathing air is not noticeable or only minimally noticeable by the operator. It has been found that an air flow with a flow velocity upwardly of approximately 1 m/s is perceived as uncomfortable by an operator. Advantageously, the flow velocity of the air flow that is exiting through the outflow region is significantly less than 1 m/s in particular is not greater than approximately 0.25 m/s. The flexible section can be designed in this context such that by compression of the first and the second flat sides the outflow region at least over sections thereof can be brought into contact at the second flat side. In the unloaded state, i.e., when no external forces are acting on the flexible section of the air-supply device, a spacing between the first and the second flat sides is provided however.

Advantageously, the at least one spacer means is extending from the first up to the second flat side. The spacer means extends therefore transversely through the entire interior and causes air swirls that effect a better and more uniform distribution of the breathing air in the interior and, in this way, a more uniform outflow from the interior through the air-permeable material. Advantageously, at least one spacer means is flexible so that a high flexibility of the air-supply device results. When the air-supply device is carried by an operator like a collar around the neck, the comfort of wearing that is thus provided is high.

A simple construction results when the spacer means is formed at least partially by a spacer knit fabric. The sheet-like flexible section can therefore be comprised of only three layers, i.e., the flexible air-permeable material, the spacer knit fabric, and a material arranged at the second flat side.

Due to the simple construction, the external shape of the air-supply device can also be adapted in a simple way to the desired purpose of use in that the exterior shape of the sheet-like flexible section is produced in the desired size. In this way, the air-supply device can be employed in multiple ways.

Advantageously, the spacer knit fabric has transverse threads that extend through the interior transverse to the material of the outflow region. The spacer knit fabric comprises in this context advantageously at least one transverse thread per square centimeter, in particular at least five transverse threads per square centimeter. In this way, a sufficiently high stability and flexibility and at the same time a good swirling action of the air in the interior are achieved. The spacer knit fabric forms an air-permeable three-dimensional structure that effects a uniform air distribution in the interior between the first and the second flat sides. At the same time, the spacer knit fabric ensures in a simple way a spacing between the outflow region and the second flat side.

It can also be provided that the spacer means is formed at least partially by a coarsely porous, flexible, air-permeable material. This can be, for example, a flexible, in particular open-cell foam.

The spacing between the first and the second flat sides advantageously amounts to at least 3 mm. In this way, a sufficient width of the interior and thus a good air distribution are achieved. A spacing of at least 5 mm, in particular of at least 7 mm, has been found to be advantageous.

The air-permeable material is advantageously a fabric. In this way, a very uniform outflow of the air can be achieved. A draft that is noticeable by the operator is thus avoided. The weave density of the air-permeable material in this context amounts to advantageously between approximately 140 g/m$^2$ and approximately 240 g/m$^2$. However, it can also be provided that the air-permeable material is a perforated plastic film. In this context, advantageously a comparatively fine perforation is provided. The diameter of the openings of the plastic film is advantageously smaller than approximately 0.5 mm. In order to achieve a uniform air outflow, advantageously fewer than 300 holes per square centimeter are provided. In order to avoid a flow velocity of the outflowing air that is too great, more than 1 hole per square centimeter is provided in particular. Advantageously, more than 20 holes per square centimeter, preferably more than 50 holes per square centimeter, are provided.

Advantageously, a sheet-like, air-impermeable material is arranged on the second flat side. The air-impermeable material is advantageously a film or a coated woven fabric. The coated woven fabric can be, for example, a polyurethane-coated polyester woven fabric. The material at the second flat side is also flexible in this context.

In order to produce in a simple way a connection for the air to be supplied, the air-supply device comprises advantageously at least one housing part that is fixed to the sheet-like flexible section and that comprises the inflow opening. The housing part is comprised advantageously of a shape-stable material, for example, of plastic material. In this way, a sufficient stability of the air-supply device is achieved.

In order to prevent that ambient air enters the breathing air region, it is advantageously provided that the air-supply device has means for producing at least one shielding air stream that shields the breathing air region at least partially relative to the environment. In this context, the flow velocity of the shielding air stream is advantageously greater than the flow velocity of the supply air stream for supplying breathing air. The flow velocity of the supply air stream advantageously amounts to not more than 0.25 m/s. The flow velocity of the shielding air stream advantageously amounts to from approximately 0.3 m/s up to approximately 1.5 m/s.

BRIEF DESCRIPTION OF THE DRAWINGS

Embodiments of the invention will be explained in the following with the aid of the drawing. It is shown in:

FIGS. 6 and 7 schematic illustrations of further embodiments of air-supply devices.

DESCRIPTION OF PREFERRED EMBODIMENTS

Figure 1:
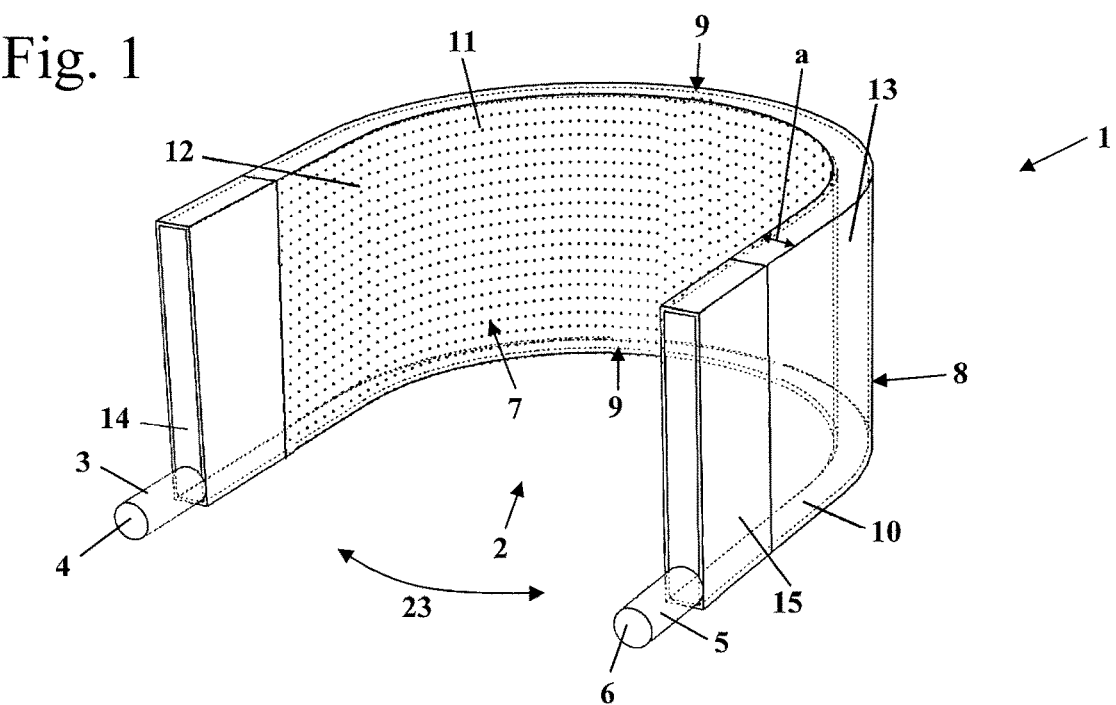
FIG. 1 a schematic perspective illustration of a first embodiment of an air-supply device.

FIG. 1 shows schematically an air-supply device 1. The air-supply device 1 is advantageously provided in order to supply breathing air to an operator, for example, when the operator is moving in a region in which the air is polluted or when the operator is allergic against components of the ambient air, for example, pollen or the like. The air-supply device 1 comprises a first connecting socket 3 on which a first inflow opening 4 is provided, as well as a second connecting socket 5 with a second inflow opening 6. By means of the inflow openings 4 and 6, breathing air, in particular pre-purified breathing air, can be supplied in operation to a breathing air region 2. A single inflow opening or a greater number of inflow openings can be advantageous also. The connecting sockets 3 and 5 each are formed on a housing part 14, 15 of the air-supply device 1. The two housing parts 14 and 15 are of a flat configuration in the embodiment.

Figure 2:
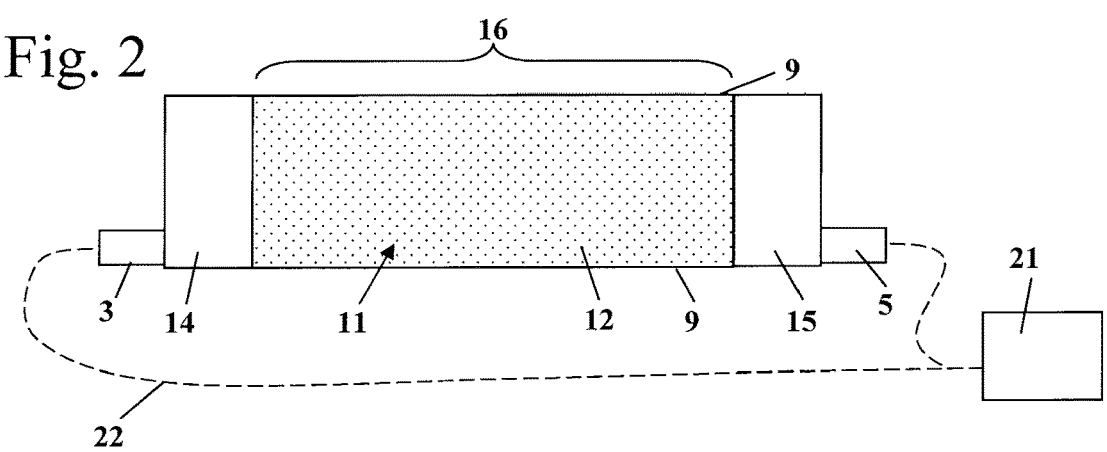
FIG. 2 a schematic side view of the air-supply device of FIG. 1.

One side of a flexible section 16 (FIG. 2) of the air-supply device 1 is secured on the housing parts 14 and 15, respectively. As shown in FIGS. 1 and 2, the flexible section 16 is of an elongate configuration and the housing parts 14 and 15 are arranged on its narrow sides. The flexible section 16 comprises a first flat side 7 which is facing the breathing air region 2 as well as a second flat side 8 which is facing away from the breathing air region. In operation, the flat side 8 is pointing away from the user. The flexible section 16 comprises also two end faces 9 which form the longitudinal sides of the flexible section 16. The flat sides 7 and 8 and the end faces 9 delimit an interior 10 into which the breathing air flows that is flowing in through the inflow openings 4 and 6.

At the first flat side 7, the flexible section 16 is covered by an air-permeable material 12 that forms an outflow region 11 for the breathing air. The air-permeable material 12 comprises a plurality of small openings through which the breathing air, distributed uniformly across the surface of the outflow region 11, flows into the breathing air region 2. The air flows out perpendicular to the surface of the air-permeable material 12. The outflow region 11 delimits the interior 10 and the air flows from the interior 10 through the outflow region 11 into the breathing air region 2.

The air-permeable material 12 can be a fabric, for example. The fabric can be comprised of synthetic fibers or of natural fibers or a mixture thereof. The weave density of the fabric advantageously amounts to between approximately 140 g/m$^2$ and approximately 240 g/m$^2$. The fabric can be, for example, a canvas fabric, gabardine, or nettle cloth. Due to the fine-mesh embodiment of the fabric, a uniform overpressure in the interior and thereby a uniform discharge of the air under overpressure relative to the environment is achieved. In this way, ambient air is displaced from the breathing air region. Due to the comparatively large outflow surface for the air, a minimal flow velocity of the exiting air is achieved.

The flow velocity advantageously amounts to less than 0.25 m/s. The outflow surface advantageously amounts to between approximately 5 cm$^2$ and approximately 500 cm$^2$. In this way, a draft that is noticeable by the operator is avoided.

Preferably, the fabric is substantially shape-stable so that the flexible section 16 requires no support material in order to maintain its shape. The air-permeable material 12 is however so flexible that the flexible section 16 can be bent with minimal force expenditure, in particular in the direction of double arrow 23. In this context, the housing parts 14 and 15 are moved closer to each other or farther away from each other. In this way, the air-supply device 1 can be adjusted easily to the user. Bending about an axis which is positioned in longitudinal direction of the flexible section 16 is avoided due to the housing parts 14 and 15.

The second flat side 8 which is facing away from the breathing air region 2 is provided with an air-impermeable material 13. The air-impermeable material 13 can be, for example, a film or a coated fabric. The coated fabric can be in particular a polyurethane-coated fabric. The air-impermeable material 13 is flexible so that the flexible section 16 is can be easily bent. Due to the air-impermeable material 13, it is ensured that the breathing air can be supplied only into the breathing air region 2. The air-impermeable material 13 extends advantageously also at the end faces 9.

It can also be provided that the air-permeable material is a perforated plastic film. The diameter of the openings of the plastic film is preferably smaller than approximately 0.5 mm. Preferably, more than 1 hole, in particular more than approximately 20 holes, preferably more than approximately 50 holes, per square centimeter, and in particular fewer than 300 holes per square centimeter are provided.

As illustrated in FIG. 1, the first flat side 7 has an approximately constant spacing a relative to the second flat side 8 across the entire flexible section 16. The spacing a amounts to advantageously at least 3 mm, in particular at least 5 mm, preferably at least 7 mm. In order to obtain a uniform spacing a between the first flat side 7 and the second flat side 8, a spacer means which will be explained in more detail in the following is provided between the first flat side 7 and the second flat side 8.

As shown in FIG. 2, the connecting sockets 3 and 5 are connected to a blower unit 21 by hoses 22 schematically illustrated in FIG. 2. The blower unit 21 comprises advantageously a blower as well as a filter unit with one or several filter elements that filter the ambient air. The ambient air is supplied by the blower with overpressure to the air-supply device 1.

Figure 3:
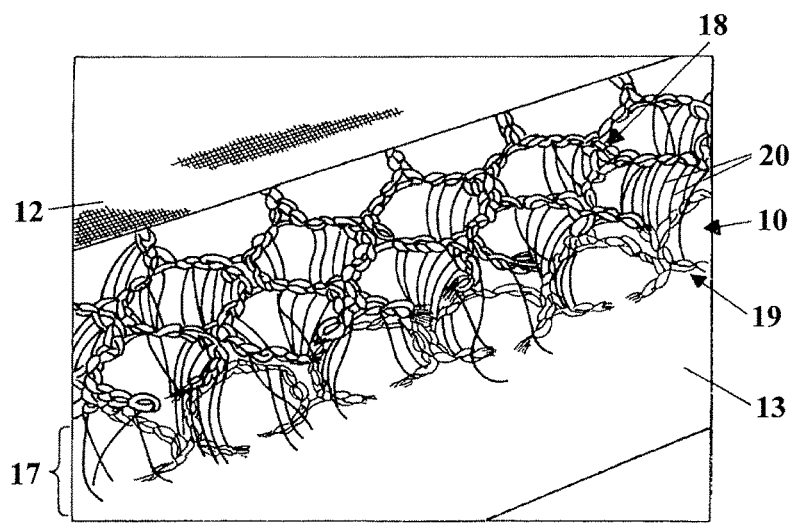
FIG. 3 a perspective sectioned illustration of the construction of the flexible section of the air-supply device of the FIGS. 1 and 2.

FIG. 3 shows the construction of the flexible section 16 in detail. In the embodiment, a spacer knit fabric 17 is provided between the air-permeable material 12 and the air-impermeable material 13. The spacer knit fabric 17 comprises a first side 18 against which the air-permeable material 12 is resting as well as a second side 19 against which the air-impermeable material 13 is resting. The two sides 18 and 19 are connected to each other by transverse threads 20. At the sides 18 and 19, the spacer knit fabric has a filigree structure with a plurality of large openings that enable a good air passage through the air-permeable material 12 and cover the air-permeable material 12 only minimally and non-sealingly.

The transverse threads 20 due to their stiffness ensure a spacing between the two sides 18 and 19 of the spacer knit fabric 17. The transverse threads 20 effect at the same time a swirling action on the air which is flowing into the interior 10. In this way, a uniform distribution of the air in the interior 10 is achieved. The spacer knit fabric 17 is flexible. It can be provided that the spacer knit fabric 17 is only bendable so that the air-supply device 1, as is indicated in FIG. 1 by the double arrow 23, can be bent. However, it can also be provided that the transverse threads 20 enable a compression of the spacer knit fabric 17. In the unloaded state, the sides 18 and 19 of the spacer knit fabric 17 however are spaced apart from each other at a spacing a so that the air which is flowing into the interior 10 is uniformly distributed across the entire outflow region 11. The spacer knit fabric 17 comprises at least one transverse thread per square centimeter, preferably at least five transverse threads per square centimeter.

Instead of a spacer knit fabric 17, a coarsely porous, flexible, air-permeable material can be provided also as a spacer means between the first flat side 7 and the second flat side 8. This can be, for example, a foam material, in particular an open-cell foam of plastic material. It can also be provided to provide as spacer means a plurality of spacer elements that are connected individually to the air-permeable material 12 and/or to the air-impermeable material 13.

Figure 4:
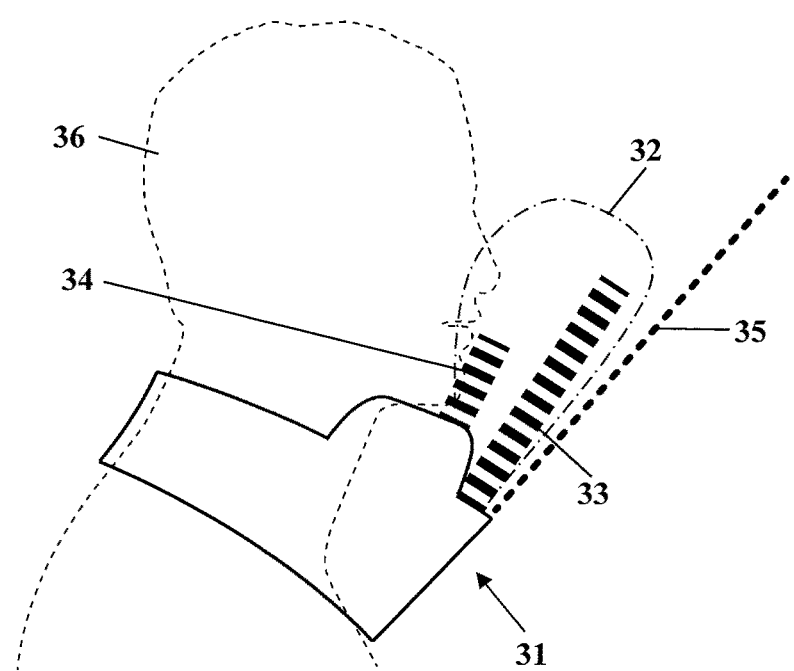
FIG. 4 a schematic illustration of an embodiment of an air-supply device on an operator.

FIG. 4 shows an embodiment of an air-supply device 31 that can be carried by a user 36 like a collar around the neck. The air-supply device 31 generates a supply air stream 33 which supplies breathing air into the breathing air region 32. The breathing air region 32 covers in this context advantageously mouth and nose of the user 36. The supply air stream 33 is supplied in this context through the outflow region 11 of the air-supply device 31 which is not illustrated in FIG. 4 in detail. The air-supply device 31 comprises also means for generating shielding air streams 34 and 35. Advantageously, at least one shielding air stream 34 is provided which shields the breathing air region 32 laterally relative to the environment. The shielding air stream 35 is oriented at a slant forwardly and shields the breathing air region 32 in forward direction, viewed from the user 36. In this way, only pre-purified air, which is flowing in from the supply air stream 33 into the breathing air region 32, is supplied to mouth and nose of the user 36. In this context, the flow velocity of the shielding air streams 34 and 35 is advantageously significantly greater than the flow velocity of the supply air stream 33. In this way, an effective shielding relative to the ambient air is achieved. The flow velocity of a shielding air streams 34, 35 advantageously amounts to approximately 0.3 m/s to approximately 2.5 m/s and the flow velocity of the supply air stream 33 amounts to less than approximately 0.25 m/s.

Figure 5:
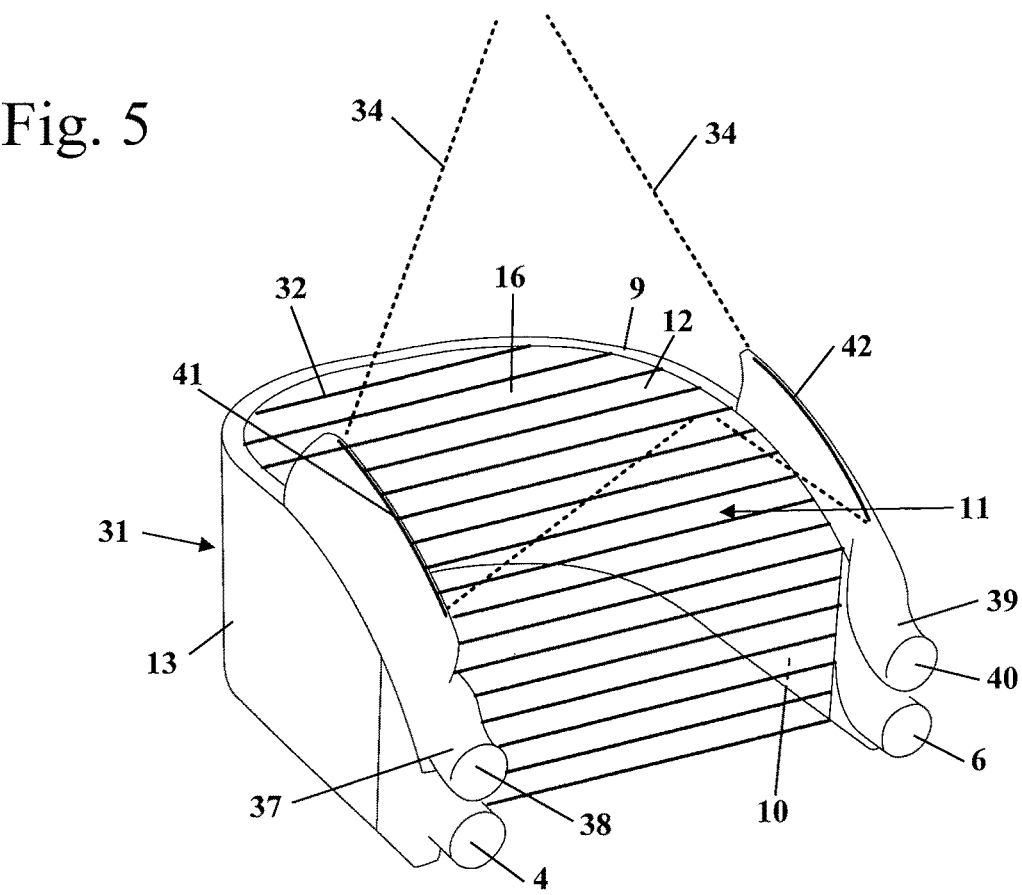
FIG. 5 a perspective illustration of the air-supply device of FIG. 4.

FIG. 5 shows the air-supply device 31 in detail. The construction of the air-supply device 31 corresponds substantially to that of the air-supply device 1 wherein the same reference characters in all embodiments identify elements that correspond to each other. The breathing air region 2 is delimited by the outflow region 11 which is formed at the flexible section 16 of the air-supply device 31. The outflow region 11 is formed on flexible air-permeable material 12 through which air can flow out of the interior 10. On the end face 9 which in operation is facing upwardly, lateral outflow openings 41 and 42 are provided which are comparatively narrow and have a minimal cross-section. The outflow opening 41 is connected by a connecting socket 37 on which a third inflow opening 38 is formed with a blower unit, not illustrated in FIG. 4. The outflow opening 42 is also connected to the blower unit by a fourth connecting socket 39 on which a fourth inflow opening 40 is provided. In this context, air can be supplied under the same pressure through all inflow openings 4, 6, 38, and 40. However, it can also be provided that the inflow openings 38 and 40 are supplied with air at increased pressure in order to improve the shielding action relative to the environment. The lateral outflow openings 41 and 42 generate advantageously the lateral shielding air stream 34. The outflow opening for producing the forwardly oriented shielding air stream 35 is not shown in FIG. 5. In this context, the orientation of the shielding air stream 34 can be suitably selected in order to achieve an effective shielding action, on the one hand, and to not be noticeable or hardly noticeable by the operator, on the other hand.

Figure 6:
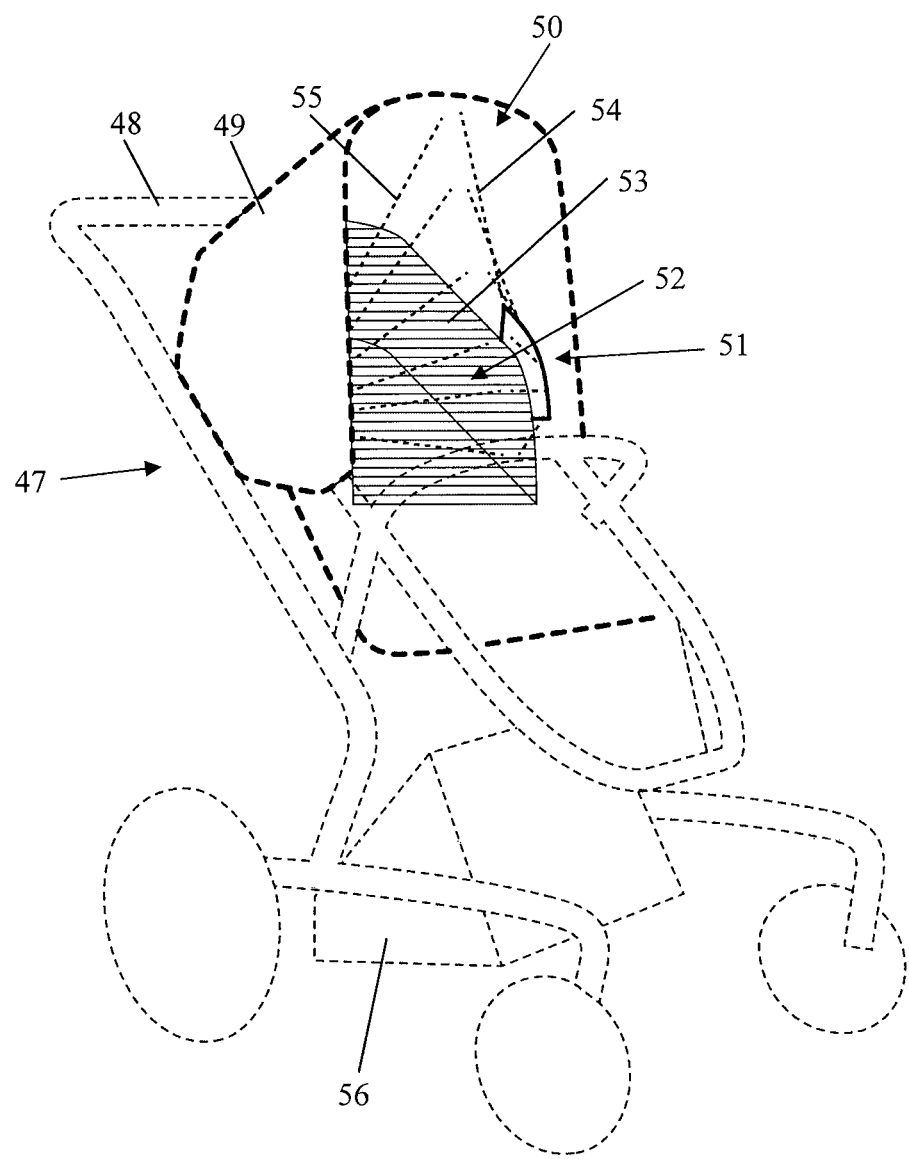

FIG. 6 shows an embodiment of an air-supply device 51 on a buggy 47. The buggy 47 comprises a push handle 48 as well as a canopy 49 which shields the area, in which the head of a child sitting in the buggy 47 is arranged, forwardly and to the rear relative to the travel direction. The canopy 49 comprises an opening 50 in forward direction. In order to prevent ambient air from entering under the canopy 49 and to supply at the same time pre-purified breathing air for the child, the air-supply device 51 is provided. The air-supply device 51 is advantageously configured in accordance with the air-supply device 31. The air-supply device 51 supplies a supply air stream 53 into the breathing air region 52. The supply air stream 53 exits through an air-permeable material 12 (FIG. 5) from an interior 10 of the air-supply device 51. The air-supply device 51 comprises also outflow openings 41 and 42 which correspond to the outflow openings 41 and 42 shown in FIG. 5 and which are not illustrated in detail in FIG. 6. Shielding air streams 54 and 55 are flowing out through the outflow openings 41 and 42 and shield the area underneath the canopy 49 relative to the environment. The shielding air streams 54 and 55 can flow in the area of the opening 50 in this context. In the embodiment, two shielding air streams 54 and 55 are provided. A single shielding airstream 54 or 55 can however be expedient also, in particular for avoiding swirling. The air-supply device 51 comprises a blower unit 56 which in the embodiment is fixed below the seat surface of the buggy 47 on the frame of the buggy 47.

Also, other fields of applications for air-supply devices 1, 31, 51 can be expedient.

In FIG. 7, an embodiment of an air-supply device 61 is illustrated which is arranged on a baby carriage 57. The baby carriage 57 comprises a push handle 58 which serves for pushing the baby carriage 57 in a pushing direction 72. The baby carriage 57 comprises a bassinet 69 in which an interior 64 is formed in which a baby can be laid. The bassinet 69 can be formed, as is conventional, of soft or shape-stable material and can be removable from the frame of the baby carriage 57. In the head area, a canopy 59 arches about the bassinet 69. An opening 60 is formed on the canopy 59. In the interior 64, an air-supply device 61 is arranged that serves for supplying breathing air. The air-supply device 61 is formed in accordance with the air-supply device 1 and supplies breathing air with minimal flow velocity into the interior 64. The breathing air can flow out through opening 60 into the environment and prevents in this way penetration of polluted ambient air through the opening 60 into the interior 64.

For supplying the supply device 61 with breathing air, a blower unit 66 is provided. The blower unit 66 comprises advantageously a blower for sucking in ambient air and a filter device for cleaning the ambient air. The bassinet 69 is covered by a cover 65 in the area which is not covered by the canopy 59. The cover 65 protects the interior 64 and a baby lying in the interior 64 from sun and rain. The cover 65 can be manufactured advantageously of fabric or plastic material and can be fastened on the bassinet 69 by one or several magnets, straps, hook and loop fasteners, patent fasteners, or the like. On the cover 65, an intake opening 67 of the blower unit 66 is provided which is formed on an intake part 70 in the embodiment. The intake part 70 is arranged at an opening of the cover 65. However, it can also be provided that the intake opening 67 is formed immediately on the cover 65. The intake opening 67 in the embodiment is formed as a slot which opens opposite to the pushing direction 72 of the baby carriage 57.

In the embodiment, a connecting part 68 that may comprise the blower and the filter unit is arranged in the interior 64 in the upper part of the foot area. It can also be advantageous to arrange the filter unit entirely or partially in the cover 65. In this way, the effective filter surface area can be enlarged in a simple way. The connecting part 68 connects the cover 65 with the air-supply device 61. By means of the connecting part 68 the breathing air flows into the air-supply device. In this context, the supply of breathing air can be provided in a central area of the air-supply device 61. The air-supply device 61 extends about the foot area of the bassinet 69 and extends on both longitudinal sides of the bassinet 69 approximately to the head area of the bassinet 69. Within the bassinet 69 a breathing air region 61 is formed into which the supply air stream 63 is supplied by the air-supply device 61. The air-supply device 61 extends advantageously across more than half of the height of the bassinet 69. In this way, a large surface area of the outflow area 71 will be achieved.

It can also be provided that the cover 65 together with the blower unit 66, which can be arranged in particular in the connecting part 68, is used without air-supply device 61. The blower unit 66 and the cover 65 supply purified breathing air into the interior 64 below the cover 65. By means of the cover 65, the penetration of unpurified ambient air into the interior 64 can be substantially avoided.

What is claimed is:

1. An air-supply device for supply of breathing air into a breathing air region, the air-supply device comprising:
    a sheet-shaped, flexible section comprising a first flat side and an oppositely positioned second flat side, wherein the sheet-shaped, flexible section comprises an interior formed between the first flat side and the second flat side; wherein the sheet-shaped, flexible section is of an elongate configuration having a first set of sides and a second set of sides wherein the first set of sides is longer than the second set of sides;
    at least one inflow opening for supply of breathing air;
    at least one outflow region formed of a flexible, air-permeable material through which the breathing air can flow out into the breathing air region, wherein the at least one outflow region is arranged on the first flat side;
    the at least one inflow opening connected via the interior with the at least one outflow region;
    at least one spacer means arranged in the interior at least at the at least one outflow region, wherein the at least one spacer means prevents the at least one outflow region from contacting the second flat side in an unloaded state of the air-supply device.

2. The air-supply device according to claim 1, wherein the at least one spacer means extends from the first flat side up to the second flat side.

3. The air-supply device according to claim 1, wherein the at least one spacer means is flexible.

4. The air-supply device according to claim 1, wherein the at least one spacer means is formed at least partially by a spacer knit fabric.

5. The air-supply device according to claim 4, wherein the spacer knit fabric comprises transverse threads that extend transverse to the flexible, air-permeable material of the at least one outflow region through the interior.

6. The air-supply device according to claim 4, wherein the spacer knit fabric comprises at least one transverse thread per square centimeter, wherein the at least one transverse thread extends transverse to the flexible, air-permeable material of the at least one outflow region.

7. The air-supply device according to claim 1, wherein the spacer means is formed at least partially by a coarsely porous, flexible, air-permeable material.

8. The air-supply device according to claim 1, wherein a spacing of the first flat side relative to the second flat side amounts to at least 3 mm.

9. The air-supply device according to claim 1, wherein the flexible, air-permeable material of the at least one outflow region is a fabric.

10. The air-supply device according to claim 1, wherein the flexible, air-permeable material of the at least one outflow region is a plastic film.

11. The air-supply device according to claim 10, wherein the plastic film comprises openings and wherein a diameter of the openings of the plastic film is smaller than 0.5 mm.

12. The air-supply device according to claim 1, wherein on the second flat side a sheet-shaped, air-impermeable material is arranged.

13. The air-supply device according to claim 12, wherein the sheet-shaped, air-impermeable material is a film or a coated fabric.

14. The air-supply device according to claim 1, further comprising at least one housing part that is fixed to the sheet-shaped, flexible section, wherein the at least one inflow opening is arranged at the at least one housing part.

15. The air-supply device according to claim 1, further comprising means for generating at least one shielding air stream shielding the breathing air region at least partially from the environment.

* * * * *